Patented Jan. 9, 1923.

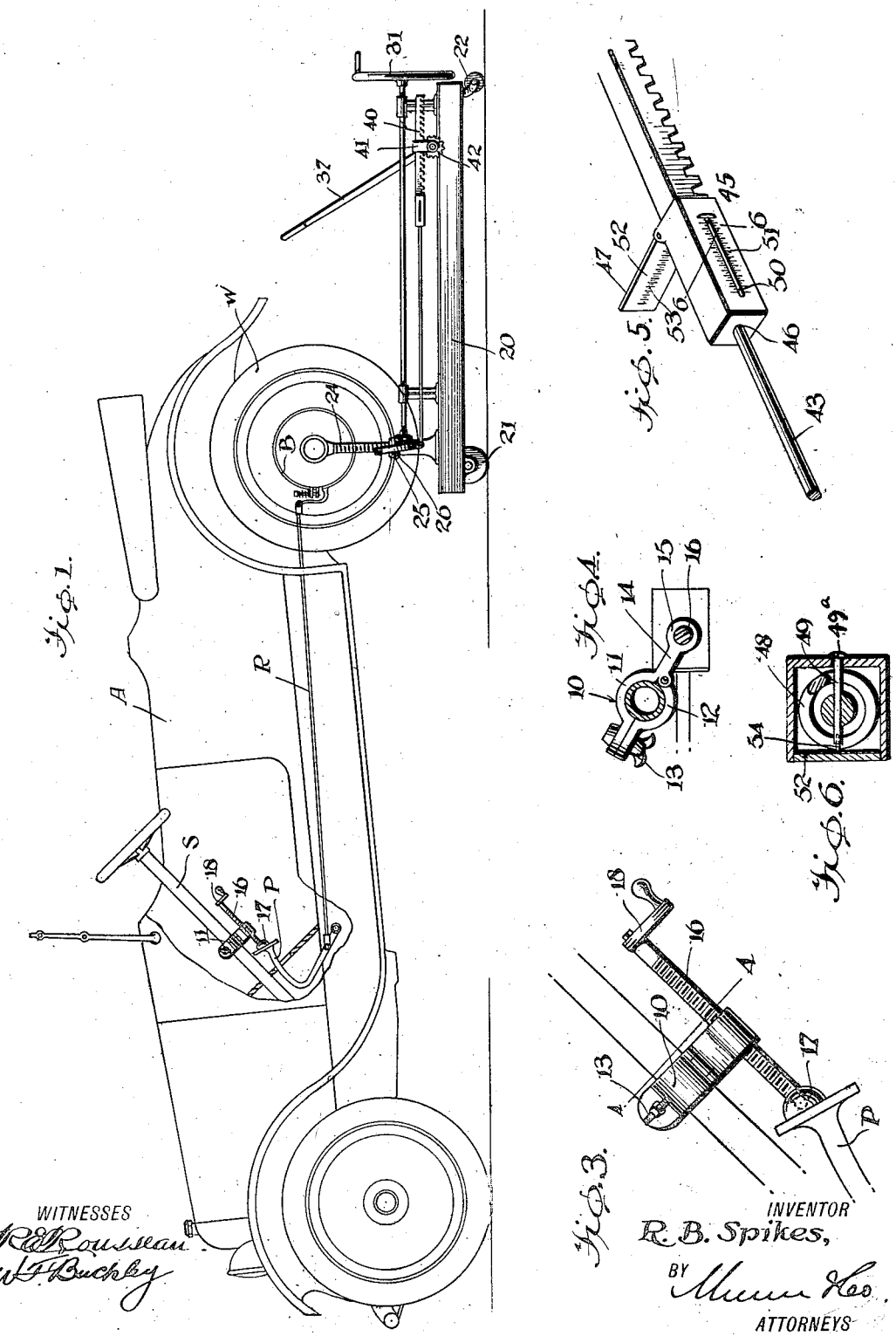

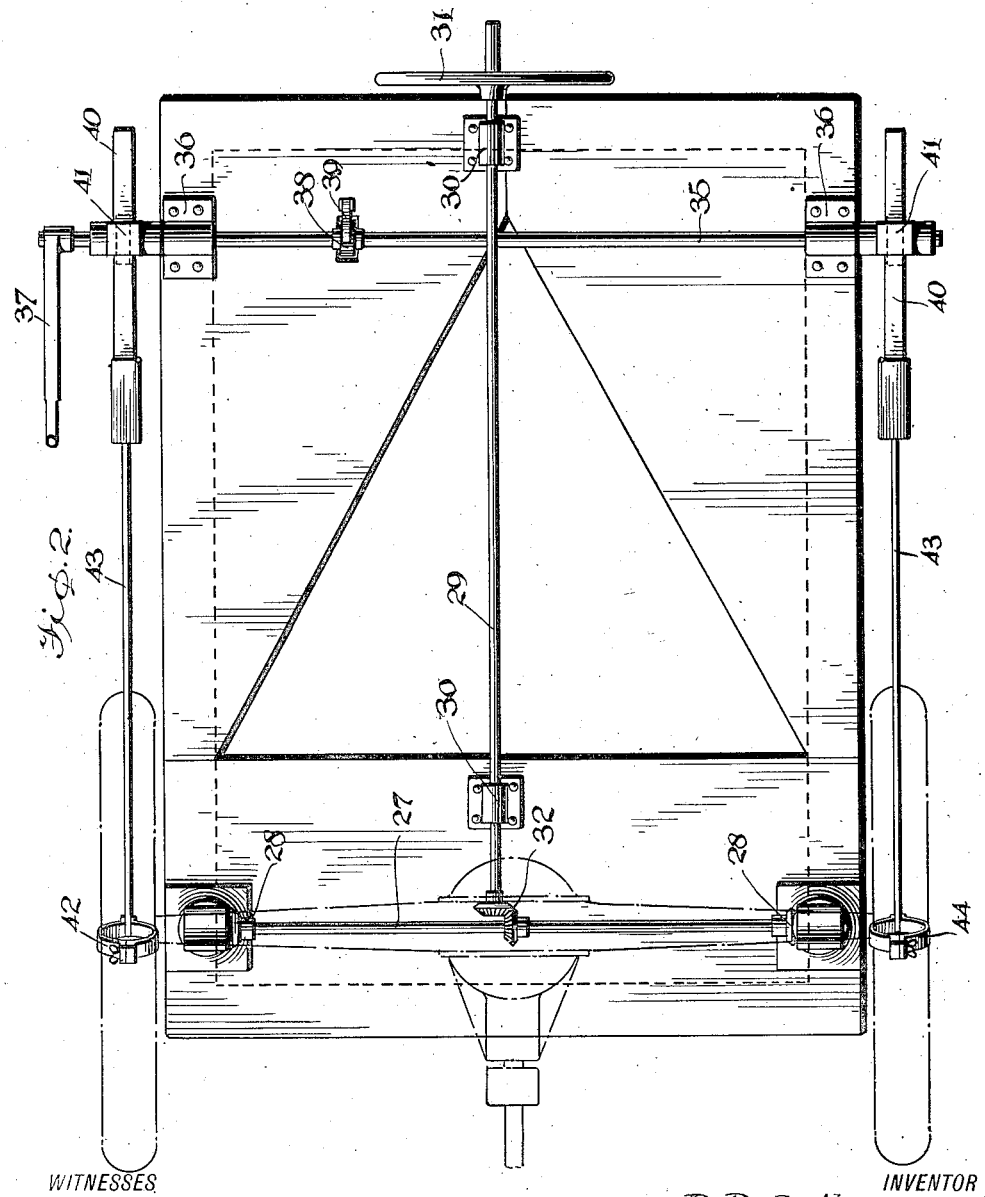

1,441,383

UNITED STATES PATENT OFFICE.

RICHARD BOWIE SPIKES, OF FORT BRAGG, CALIFORNIA, ASSIGNOR OF ONE-HALF TO LUCIUS W. LOMAX, OF OAKLAND, CALIFORNIA.

BRAKE-TESTING MACHINE.

Application filed September 21, 1921. Serial No. 502,228.

*To all whom it may concern:*

Be it known that I, RICHARD B. SPIKES, a citizen of the United States, and a resident of Fort Bragg, in the county of Mendocino and State of California, have invented certain new and useful Improvements in Brake-Testing Machines, of which the following is a specification.

The present invention relates in general to brake testing machines, and more particularly to brake testing machines particularly adapted for use in conjunction with motor vehicles, such as automobiles, or the like.

The object of the invention is to provide a brake testing machine of this character which provides for the testing of the efficiency or of the power of the brake and makes and records the results of the test, and which is of simple and durable construction, reliable in operation, and easy and inexpensive to manufacture and adapted to be manipulated by a single operator.

Other objects and advantages reside in the certain novel features of construction, combination and arrangement of parts which will be hereinafter more fully described and particularly pointed out in the appended claims, reference being had to the accompanying drawings, in which:

Figure 1 is a side elevational view illustrating the machine in operation and testing the brakes of an automobile, Figure 2 is a plan view of the machine, the cooperating elements of the automobile being indicated in dotted lines, Figure 3 is a detail perspective view of the means provided for setting the brakes, Figure 4 is a detail view in transverse section on the lines 4—4 of Figure 3, Figure 5 is a detail perspective view of the indicating and recording mechanism and associated structure, Figure 6 is a transverse sectional view on the line 6—6 of Figure 5.

Referring to the drawings wherein for the sake of illustration is shown the preferred embodiment of the invention, it will be seen that the invention is illustrated as testing the brakes of an automobile. The automobile which is designated at A, may be of any standard or conventional make, and as usual, includes a steering post S, a brake pedal P adjacent said steering post, rear wheels W, brake mechanism designated at B cooperating with the usual brake drum from the rear wheels, and a brake rod R connected to the brake pedal and the brake mechanism, whereby the brake mechanism is under the control of the brake pedal.

Means is provided for setting the brake and includes a clamp designated generally at 10, which consists of two clamp members 11 and 12 which encircle and clamp the steering post S and are secured in clamped position by means of nuts and bolts 13. The clamp is provided with an extension 14 having a threaded bearing 15 therein. A screw shaft 16 operates in the threaded bearing 15 and carries at its lower end a swiveled foot 17 which engages the brake pedal as shown in Figure 3. The other end of the shaft carries an operating handle 18. It is obvious that when the handle 18 is turned in one direction, the shaft may be moved downward and the foot 17 thereof engaging the brake pedal, will move the same to set the brakes. A reverse movement of the handle 18 will release the brakes.

A platform 20 is provided and has a pair of ground wheels or rollers 21 arranged at one end and a centrally disposed caster 22 at its other end. At the end of the platform supported by the pair of wheels 21, there is provided a pair of jacks 23 preferably of the screw type and adapted to engage and raise the rear wheels of the automobile. The screw jacks each include a screw shaft 24 and a nut 25 cooperating therewith and having a bevel gear 26 formed on one of its faces. A jack shaft 27 extends transversely between the members of the pairs of jacks and is provided with beveled pinions 28 which engage with the bevel gears 26 of the driving nuts of the jacks. The jack shaft is rotated from a drive shaft 29 journaled in suitable bearings 30 provided on the platform and having a hand wheel or other suitable means 31 to facilitate or provide for its rotation. It is obvious that instead of using a hand wheel 31 an electric motor or the like may be provided for this purpose. The motion of the drive shaft 29 is transmitted to the jack shaft by means of bevel gears or the like 32.

Pulling means is provided whereby a force may be exerted upon the wheel or other element being braked tending to move it against the action of the brake. This pulling means includes a transverse shaft 35 rotatably journaled in suitable bearings 36 provided on the platform. Suitable means is provided for rotating the shaft 35 and preferably consists of a hand lever 37, although a suitable motor may be employed for this purpose if desired. A ratchet wheel 38 is fixed to the shaft and a pawl 39 pivoted to the platform cooperates with the ratchet wheel and constitutes pawl and ratchet mechanism for normally preventing reverse movement of the shaft. The pawl 39 may, however, be swung out of engagement with the ratchet wheel when it is desired that the shaft partake of reverse movement.

Motion transmission mechanism is provided between the shaft 35 and the wheels or elements being braked in order that the pull exerted by the pulling means may be transmitted to the wheels or elements and tend to move them against the action of the brake. This motion transmission mechanism includes rack bars 40 slidably journaled in suitable bearings or guides 41 and co-acting with pinions 42 fixed to the shaft 35 and meshing with the teeth of the rack bar. Connecting rods 43 are secured at one of the ends thereof by means of releasable clamping bands 44 to the wheel or other element being braked, and they are connected at their other ends to the rack bars 40.

Means is provided for measuring, recording, and indicating the efficiency of the brake and the force which it exerts to retard or stop the movement of the element being braked. This means includes casings or housings 45 each having an open end receiving and fixed to one end of the adjacent rack bar. The opposite end of each casing is closed and is provided with a central opening 46 through which slidably extends the adjacent connecting rod 43. One side of the casing is open, and is closed by a swinging door 47. Within the casing and encircling the rod 43 which slidably extends therethrough, is a testing spring or similar elastic element 48 of predetermined strength, tension and elasticity or resiliency. These properties of the spring are such that its movement when compression is exerted thereupon, is proportional to the degree of the compressive force acting thereon. In order that the pull exerted upon the wheel or element being braked may also be impressed upon the testing spring, it is incorporated in the connection, in fact it constitutes the connection between the rack bar and the connecting bar. A cross pin 49 is extended through a suitable opening provided therefor in the connecting rod and bears against one end of the testing spring 48, the other end of the testing spring bearing against the closed end of the casing, 45. The cross pin 49 is suitably secured in position in the opening in the connecting rod.

The casing 45 has provided in the side opposite the door 47 an elongated longitudinally extending slot 50 and on this side adjacent each edge of the slot, is provided graduations or other indicia 51 which affords the desired indication. The cross pin 49 is extended through the slot 50 and has a head 49ª which cooperates with the indicia 51 and serves as a pointer to designate the particular graduations to be noted. A chart 52 is suitably affixed to the inner side of the door 47 and is also provided with indicia or graduations 53 similar to the graduations 51. A stylus or marker 54 is carried in the cross pin 49 and cooperates with the chart 52 to record thereon the results of the test.

In operation, the wheeled platform 20 is first entered between the rear wheels and beneath the automobile. The jacks are then elevated to raise the automobile to the position shown in Figure 1, preferably by means of turning the handle 31. The brake is then set by manipulating the handle 18, and the pull is then exerted by grasping the lever 37 and pulling the same to rotate the shaft 35. This rotation of the shaft 35 by means of the pinions 42 induces a rectilinear motion of the rack bars 40. The pull of the rack bars is transmitted to the wheels or elements being braked by means of the connecting rods, releasable clamp bands, etc. This pull is also impressed upon the testing spring 48 and so long as the brake holds the element being braked, the testing spring is deformed in proportion to the amount or degree of the pulling force. In this instance, the spring is compressed, and the compression of the spring is accompanied by a movement of the cross pin 49. The cross pin 49 controlling the stylus or marker 54 produces a record upon the chart 52 and simultaneous with the formation of this record, the head 49ª of the pin affords an indication by its co-action with the indicia 51. When the pulling force has been exerted to such a degree that it overcomes the braking action of the brake mechanism, the wheel or element being braked moves or slips under the influence of this pulling force, and this permits an expansion or reformation of the spring 48, which movement of the spring is accompanied by a corresponding movement of the stylus and the indicating head 49ª, thus correctly modifying the recording and the indication. It is to be noted during the time that the operator is manipulating the lever 37 to exert the pull, reverse movement of the shaft 35 is prevented by means of the pawl and ratchet mechanism.

I claim:

1. In a brake testing machine for use with motor vehicles or the like, in combination with braking mechanism and the wheels being braked thereby, means cooperating with the braking mechanism for setting the brakes, including a threaded bearing carried by the steering post, and a screw shaft journaled in said threaded bearing and having a swivel foot cooperable with the braking mechanism, a wheeled platform, jacks carried by said wheeled platforms and engageable with the automobile for lifting the wheels thereof clear of the ground, pulling means carried by the wheeled platform, motion transmission means between said pulling means and the wheels of the automobile whereby said pulling means tends to move said wheels against the action of the braking mechanism, a chart and a stylus cooperating with said chart and operated by said pulling means in accordance with the pull exerted thereby.

2. In a brake testing machine, in combination with a brake and an element with which the brake cooperates, means for setting the brake, a wheeled platform, pulling means carried by the wheeled platform, motion transmission means between said pulling means and said element being braked whereby said pulling means tends to move said element against the action of said brake, a chart and a stylus cooperating with said chart and operated by the pulling means in accordance with the pull exerted thereby.

3. In a brake testing machine for use with automobiles, in combination with the wheels and braking mechanism therefor, means for setting the brake, a wheeled platform, jacks carried by the wheeled platform for lifting the wheels of the automobile clear of the ground, pulling means including a rotatable shaft journaled on said wheeled platform, pinions fixed to said shaft, operating means for said shaft, and pawl and ratchet mechanism for preventing reverse movement thereof, motion transmission means between said pulling means and said wheel, including rack bars driven from said pinions, connecting rods and releasable clamp bands carried by the connecting rods and engageable with the wheels, a chart, a stylus cooperating with the chart, and means controlling said stylus in accordance with the pull exerted by said pulling means comprising a testing spring interposed in the connection between said connecting rod and said rack bar.

4. In a brake testing machine, in combination with a brake and an element with which the brake cooperates, means for setting the brake, pulling means, motion transmission means between said pulling means and said element whereby said pulling means tends to move said element against the action of said brake, a chart, a stylus cooperating with said chart and means for operating said stylus in accordance with the degree of pull exerted by said pulling means.

5. In a brake testing machine, in combination with a brake and an element with which the brake cooperates, pulling means, motion transmission means between said pulling means and said element whereby said pulling means tends to move said element against the action of said brake, a chart, a stylus cooperating with said chart and means for operating said stylus in accordance with the degree of pull exerted by said pulling means.

6. In a brake testing machine, pulling means, motion transmission means adapted to exert the force of the pulling means upon the element being braked, said motion transmission means including a connecting rod, a casing through which said connecting rod slidably extends, a testing spring arranged in said casing and encircling said connecting rod, a cross pin extending transversely of the connecting rod and secured thereto, said testing spring bearing at one end against said cross pin and at the other end against said casing, a chart carried by said casing, and a stylus carried by the cross pin and operating upon the chart, said casing being also provided with a longitudinal slot in one of its walls and said cross pin having a head constituting a pointer and operating along said slot, said casing having indicia along each edge of said slot with which said pointer coacts.

7. In a brake testing machine, pulling means, motion transmission means adapted to exert the force of the pulling means upon the element being braked, said motion transmission means including a connecting rod, a casing through which said connecting rod slidably extends, a testing spring arranged in said casing and encircling said connecting rod, a cross pin extending transversely of the connecting rod and secured thereto, said testing spring bearing at one end against said cross pin and at the other end against said casing, a chart carried by said casing, and a stylus carried by the cross pin and operating upon the chart.

RICHARD BOWIE SPIKES.